United States Patent
Heap et al.

(10) Patent No.: US 11,491,981 B2
(45) Date of Patent: Nov. 8, 2022

(54) METHOD OF DETERMINING A COMMANDED FRICTION BRAKE TORQUE

(71) Applicant: GM GLOBAL TECHNOLOGY OPERATIONS LLC, Detroit, MI (US)

(72) Inventors: Anthony H. Heap, Ann Arbor, MI (US); Jordan Billet, Ann Arbor, MI (US)

(73) Assignee: GM Global Technology Operations LLC, Detroit, MI (US)

(*) Notice: Subject to any disclaimer, the term of this patent is extended or adjusted under 35 U.S.C. 154(b) by 755 days.

(21) Appl. No.: 16/431,184

(22) Filed: Jun. 4, 2019

(65) Prior Publication Data

US 2020/0385004 A1  Dec. 10, 2020

(51) Int. Cl.
| | |
|---|---|
| *F16H 59/14* | (2006.01) |
| *B60W 30/18* | (2012.01) |
| *B60W 10/11* | (2012.01) |
| *B60W 10/184* | (2012.01) |
| *F16H 61/04* | (2006.01) |

(52) U.S. Cl.
CPC ...... *B60W 30/18072* (2013.01); *B60W 10/11* (2013.01); *B60W 10/184* (2013.01); *B60W 2510/105* (2013.01); *B60W 2710/1005* (2013.01); *B60W 2710/18* (2013.01); *F16H 2059/148* (2013.01); *F16H 2061/0496* (2013.01)

(58) Field of Classification Search
CPC ........... B60W 30/18136; B60W 10/02; B60W 30/18072; F16H 61/0213; F16H 61/0437; F16H 59/14; F16H 2059/148; B60K 26/021; B60K 26/00; B60K 23/00; Y02T 10/60; F16D 2500/1085

See application file for complete search history.

(56) References Cited

U.S. PATENT DOCUMENTS

| | | | | |
|---|---|---|---|---|
| 5,046,174 A | * | 9/1991 | Lentz | F16H 61/061 701/66 |
| 6,308,125 B1 | * | 10/2001 | Gleason | B60W 30/1819 701/67 |
| 2002/0113615 A1 | * | 8/2002 | Atarashi | H02P 29/662 318/400.01 |
| 2003/0027685 A1 | * | 2/2003 | Watanabe | B60W 10/04 477/107 |

(Continued)

OTHER PUBLICATIONS

Kim et al. (Kim et al. "Control of Dry Clutch Engagement for Vehicle Launches via a Shaft Torque Observer," 2010 American Control Conference, Baltimore, MD, Jun. 30-Jul. 2, 2010, https://manualzz.com/doc/28185811/control-of-dry-clutch-engagement-for-vehicle-launches-via) (Year: 2012).*

*Primary Examiner* — Hunter B Lonsberry
*Assistant Examiner* — Daniel M. Robert
(74) *Attorney, Agent, or Firm* — Quinn IP Law (57) ABSTRACT

A method of determining a commanded friction brake torque is disclosed. The method uses inputs, such as from a gearshift sensor, an accelerator pedal sensor, a brake pedal sensor, and engine torque output sensor, a transmission speed input sensor and a transmission speed output sensor, to determine how much engine braking or regenerative braking is occurring. The method then uses this information combined with the braking command information from the brake pedal sensor to determine the amount of friction braking to apply to the friction brakes.

19 Claims, 6 Drawing Sheets

(56) References Cited

U.S. PATENT DOCUMENTS

| | | | | |
|---|---|---|---|---|
| 2003/0173826 A1* | 9/2003 | Tazoe | ................... | B60W 10/08 |
| | | | | 903/947 |
| 2005/0288153 A1* | 12/2005 | Whitton | ............... | F16H 61/061 |
| | | | | 477/146 |
| 2012/0035819 A1* | 2/2012 | Hebbale | .................. | F16H 61/00 |
| | | | | 701/60 |
| 2014/0257653 A1* | 9/2014 | Sato | ..................... | B60W 50/14 |
| | | | | 701/55 |
| 2016/0375893 A1* | 12/2016 | Nefcy | .................. | B60W 20/14 |
| | | | | 180/65.265 |

* cited by examiner

METHOD OF DETERMINING A COMMANDED FRICTION BRAKE TORQUE

INTRODUCTION

This disclosure relates to methods of determining transmission output torque.

In the control of transmissions for automotive or other applications, various sensors and methodologies are used to sense or estimate a transmission's operating parameters. These parameters may include various temperatures, fluid levels, fluid pressures, speeds, accelerations and torques. Some of these parameters may be sensed directly by sensors or instruments, while others may be difficult to sense or measure directly and thus may be determined indirectly by various estimation approaches.

In both hybrid and non-hybrid automotive applications, blended braking and various other approaches may be used to achieve smoother output torque profiles and shift quality. These approaches attempt to monitor and control the torques being commanded and produced by the propulsion and braking systems (e.g., by the engine, electric motors, flywheels, batteries, transmission, other driveline components, friction braking system and/or regenerative braking motor-generator system). Therefore, in situations where it may be difficult to directly sense a transmission operating parameter such as transmission output torque, it is useful to be able to determine such a parameter from other available parameters.

SUMMARY

According to one embodiment, a method of controlling a transmission includes: determining a transmission kinematic state based on a commanded transmission gear range, a transmission input speed, and a transmission output speed; determining a transmission input torque; determining a first rotational acceleration of a first portion of the transmission rotationally disposed at a first reference point in the transmission; determining a second rotational acceleration of a second portion of the transmission rotationally disposed at a second reference point in the transmission; and determining a transmission output torque as a sum of a gear ratio of the commanded transmission gear range multiplied by the transmission input torque, a first aggregate inertia multiplied by the first rotational acceleration, and a second aggregate inertia multiplied by the second rotational acceleration, wherein the first and second aggregate inertias are based on the transmission kinematic state. The method may also be configured for operation during closed throttle downshifts.

The transmission kinematic state may be one of a first gear state having a first gear ratio, a second gear state having a second gear ratio lower than the first gear ratio, and an intermediate state during which the transmission transitions from the first gear state to the second gear state.

The transmission may be configured for use in a vehicle having a powerflow including a series of powerflow members including a torque converter turbine, a transmission input shaft, a plurality of rotating transmission components including at least one shifting clutch, a transmission output shaft, a differential, at least one axle, at least one driven wheel and, if the transmission is configured for longitudinal use in the vehicle, a drive shaft. The powerflow defines a downstream direction from the transmission input shaft to the transmission output shaft, and an upstream direction from the transmission output shaft to the transmission input shaft. Each of the powerflow members has a respective rotational inertia, a respective first conversion gear ratio with respect to the first reference point, a respective second conversion gear ratio with respect to the second reference point, a respective first converted rotational inertia being the respective rotational inertial multiplied by the respective first conversion gear ratio, and a respective second converted rotational inertia being the respective rotational inertial multiplied by the respective second conversion gear ratio.

In each of the first and second gear states, the first aggregate inertia is a sum of the respective first converted rotational inertias of all of the powertrain members when the second aggregate inertia is zero, and the second aggregate inertia is a sum of the respective second converted rotational inertias of all of the powertrain members when the first aggregate inertia is zero. In the intermediate gear state, the first aggregate inertia is a sum of the respective first converted rotational inertias of the powertrain members upstream of the at least one shifting clutch, and the second aggregate inertia is a sum of the respective second converted rotational inertias of the powertrain members downstream of the at least one shifting clutch.

The first reference point may be one of a torque converter turbine and a transmission input shaft, and the second reference point may be a transmission output shaft. The method may further include determining a differential ratio, determining an axle rotational inertia, determining an axle acceleration, and determining an axle output torque as a sum of the differential ratio multiplied by the transmission output torque and the axle rotational inertia multiplied by the axle acceleration. The method may additionally include determining a desired coast torque, and determining a propulsion system torque as a difference between the axle output torque and the desired coast torque. The method may also include determining a desired total brake torque, and determining a commanded friction brake torque as a difference between the desired total brake torque and the propulsion system torque. The method may further include providing a signal for actuation of a friction braking system, wherein the signal corresponds to the commanded friction brake torque. The method may also be configured for operation during blended braking.

According to one embodiment, a method of determining a transmission output torque Tour for a transmission includes: determining a transmission kinematic state based on a commanded transmission gear range, a transmission input speed $N_{IN}$, and a transmission output speed $N_{OUT}$, wherein the transmission kinematic state is one of a first gear state having a first gear ratio, a second gear state having a second gear ratio lower than the first gear ratio, and an intermediate state during which the transmission transitions from the first gear state to the second gear state; determining a transmission input torque $T_{IN}$; determining a first acceleration $\text{Ndot}_1$ at a first reference point in the transmission; determining a second acceleration $\text{Ndot}_2$ at a second reference point in the transmission; and determining the transmission output torque $T_{OUT}$ as $A(T_{IN})+B(\text{Ndot}_1)+C(\text{Ndot}_2)$, wherein A is a gear ratio of the commanded transmission gear range, and B and C are aggregate inertias based on the transmission kinematic state.

According to one embodiment, a method of determining a transmission output torque Tour for a transmission includes: determining a transmission kinematic state based on a commanded transmission gear range, a transmission input speed $N_{IN}$, and a transmission output speed $N_{OUT}$, wherein the transmission kinematic state is one of a first gear state having a first gear ratio, a second gear state having a second gear ratio lower than the first gear ratio, and an intermediate state during which the transmission transitions from the first gear state to the second gear state; determining a transmission input torque $T_{IN}$; determining a first acceleration $Ndot_1$ at a first reference point in the transmission; determining a second acceleration $Ndot_2$ at a second reference point in the transmission different from the first reference point; determining a third acceleration $Ndot_3$ at a third reference point in the transmission different from each of the first and second reference points; and determining the transmission output torque $T_{OUT}$ as $A(T_{IN})+B(Ndot_1)+C(Ndot_2)+D(Ndot_3)$, wherein A is a gear ratio of the commanded gear range, and B, C and D are aggregate inertias based on the transmission kinematic state.

Each of the powerflow members has a respective rotational inertia, a respective first conversion gear ratio with respect to the first reference point, a respective second conversion gear ratio with respect to the second reference point, a respective third conversion gear ratio with respect to the third reference point, a respective first converted rotational inertia being the respective rotational inertial multiplied by the respective first conversion gear ratio, a respective second converted rotational inertia being the respective rotational inertial multiplied by the respective second conversion gear ratio, and a respective third converted rotational inertia being the respective rotational inertial multiplied by the respective third conversion gear ratio.

In the intermediate gear state, B may be a sum of the respective first converted rotational inertias of the powertrain members upstream of the at least one shifting clutch, C may be a sum of the respective second converted rotational inertias of the powertrain members downstream of the at least one shifting clutch, and D may be equal to zero. In each of the first and second gear states, D may be a sum of the respective third converted rotational inertias of all of the powertrain members, and B and C may each be equal to zero.

DETAILED DESCRIPTION

Referring now to the drawings, wherein like numerals indicate like parts in the several views, a method 200 of determining a transmission output torque $T_{OUT}$ for a transmission 12 is shown and described herein.

Figure 1:
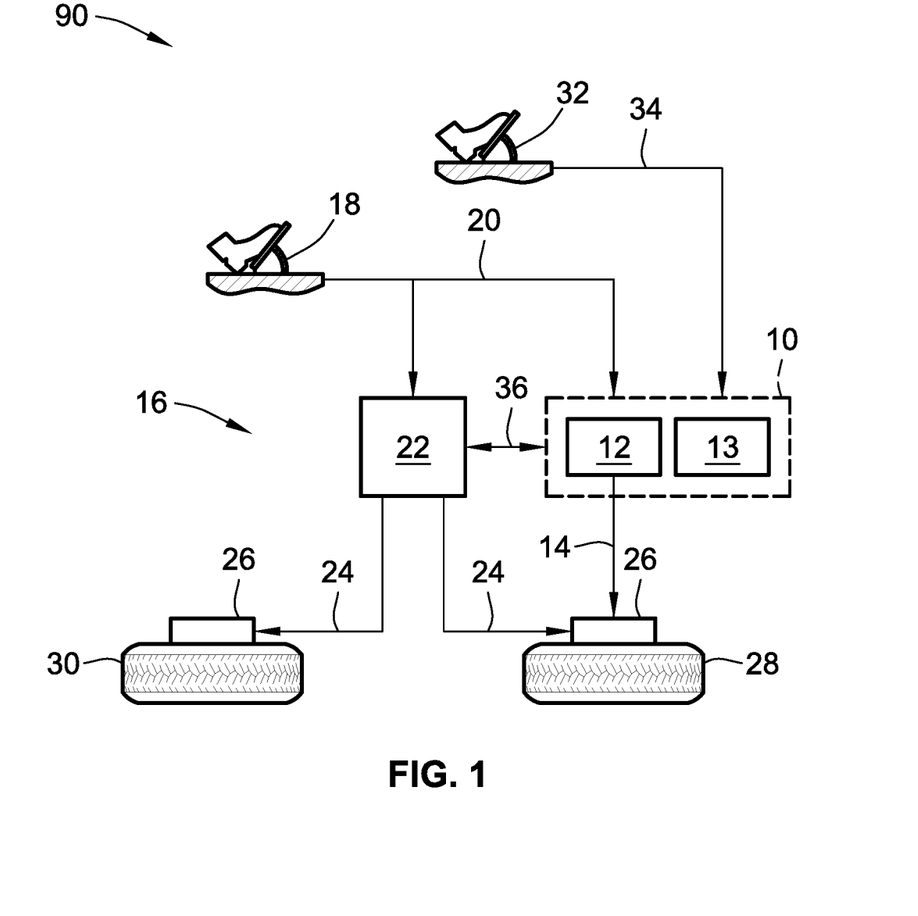
FIG. 1 is a schematic view of a portion of an exemplary vehicle configured to execute a control method in accordance with the disclosure.

FIG. 1 shows a schematic view of an exemplary vehicle 90 in accordance with the present disclosure. The vehicle 90 has a powertrain system 10 which includes a transmission 12 and various other powertrain subsystems and components 13, such as an engine, electric motors, battery, regenerative braking systems, torque converter, torque converter clutch (TCC), etc. The transmission 12 may include a step-gear transmission, a dual-clutch transmission or a manual transmission, and the powertrain system 10 may be a hybrid propulsion system or a non-hybrid propulsion system. The various components 13 of the powertrain system 10 may be operatively interconnected with each other and with the transmission 12. The vehicle 90 also includes a friction braking system 16 (e.g., a brake-by-wire system).

The transmission 12 has an output 14 operatively connected to the drive wheels 28 of the vehicle 90 and optionally to the brakes 26 of the drive wheels 28. (Although not shown in the diagram, the output 14 may also be operatively connected to the other wheels 30 which would otherwise be non-driven wheels 30 if the output 14 were not operatively connected thereto. In hybrid or partially electrified vehicles 90, the brakes 26 may also include motor-generators which may be used for traction and regenerative braking.) The output 14 may be an item of hardware such as a drive shaft, or a signal which enables the wheels 28 (and optionally wheels 30) to be driven by the transmission 12 and/or some portion 13 of the powertrain system 10.

The powertrain system 10 receives an acceleration torque request 34 from an accelerator pedal 32 which is operated by a human operator. Optionally, the powertrain system 10 may also receive a brake pedal torque request 20 from a brake pedal 18 which is also operated by a human operator. The brake pedal torque request 20 is received by a braking module 22, such as an electronic braking control module (EBCM), which sends a friction braking torque command 24 to the friction brakes 26 of the drive wheels 28 and optionally to the friction brakes 26 of the non-driven wheels 30 as well. One or more components of the friction braking system 16, such as the braking module 22, may have a connection or interface 36 with the powertrain system 10. This connection 36 may be a one-way connection or a two-way connection between the braking system 16 and the powertrain system 10, and may take the form of hardware, software or some combination thereof. The connection 36 may interface with one or more portions of the powertrain system 10, such as the transmission 12 and/or other components 13 such as the engine, torque converter, TCC, etc., including one or more electronic control modules for these portions 12, 13 of the powertrain system 10.

Figure 2:
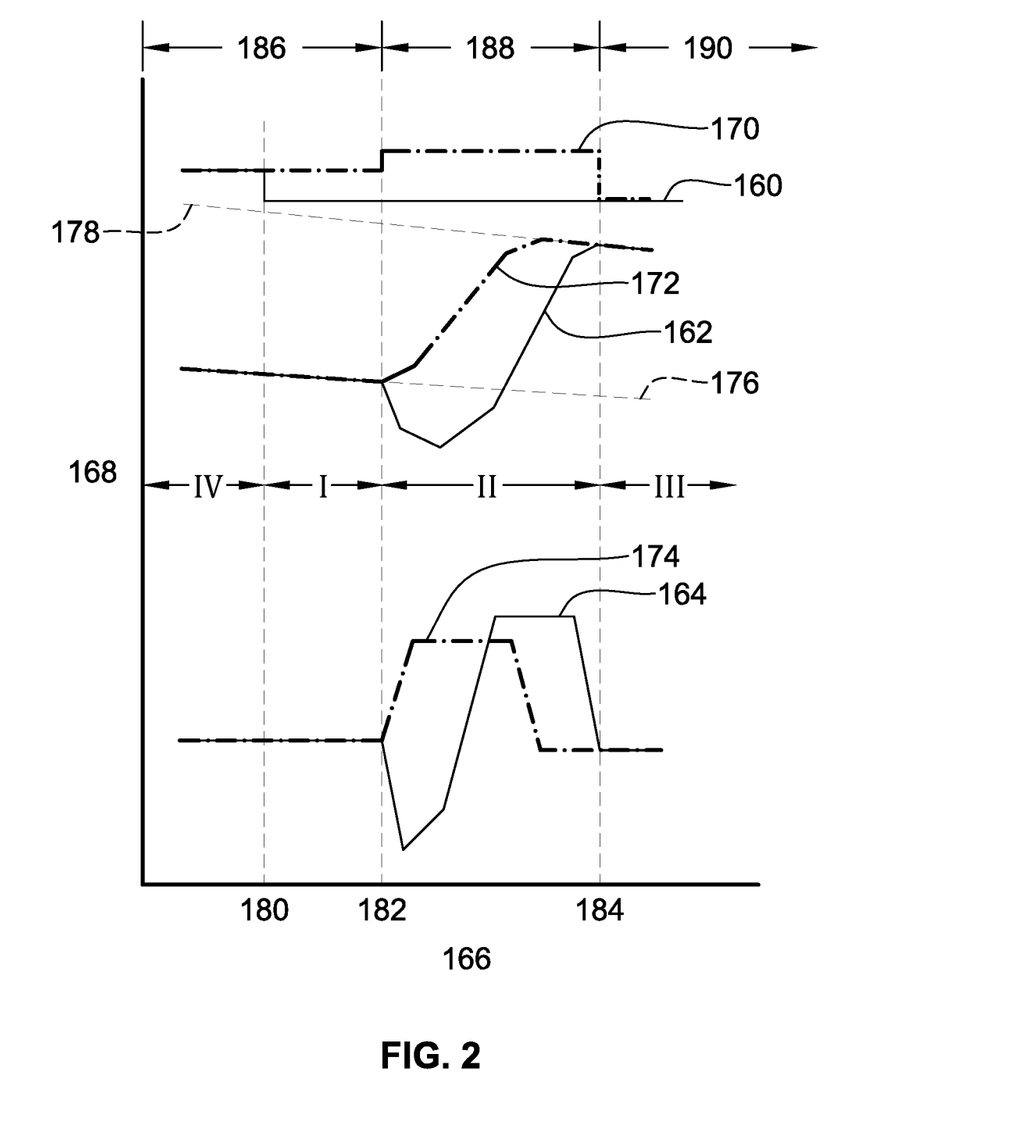
FIG. 2 graphically shows an example of the gear state, turbine speed and turbine acceleration of a transmission in accordance with the disclosure.

During operation, the transmission 12 may progress through multiple gears and various modes or states. One such mode is "closed throttle downshifting" or "coasting", in which the human operator is not depressing the accelerator pedal 32 and the vehicle 90 is slowing down. In this coasting mode, the transmission 12 may downshift; for example, from $6^{th}$ gear to $5^{th}$ gear, then $5^{th}$ gear to $4^{th}$ gear, and so on. FIG. 2 shows a graphic representation of the gear state 160, turbine speed 162 and turbine acceleration 164 for an exemplary downshift from $4^{th}$ gear to $3^{rd}$ gear. The horizontal axis 166 represents time and the vertical axis 168 represents the setting of the gear state 160 and the magnitudes of the turbine speed 162 and the turbine acceleration 164. Also shown in dotted lines are profiles for a desired or targeted turbine speed 172 and turbine acceleration 174. (These profiles may be "desired" or "targeted" because of one or more optimization algorithms, shift control schemes, etc.) Dotted line 176 represents the turbine speed of the attained or current gear (in this example, $4^{th}$ gear) and dotted line 178 represents the turbine speed of the commanded gear (here, $3^{rd}$ gear). Reference numerals I, II, III, and IV represent four sequential time segments delineated by times 180, 182, and 184 as shown. At time 180, a command is issued to change the gear state 160 from $4^{th}$ gear to $3^{rd}$ gear.

However, due to the time required for certain kinematic events (e.g., the engagement and release of clutches and brakes in the transmission 12, the spin-up of the torque converter turbine 52, etc.), the change in gear state 160 requested at time 180 might not occur immediately, and may take until time 184 before the downshift to the next lower gear is completed. During this period from time 180 to time 184, an offgoing clutch 64 begins to slip at time 182, noted by the changes in turbine speed 162, 172 and turbine acceleration 164, 174 at that time 182. Then, from 182 to 184, the offgoing clutch 64 continues to slip while an oncoming clutch 66 begins to engage, and by time 184 the offgoing clutch 64 has fully disengaged and the oncoming clutch 66 has fully engaged. This is reflected in dotted line 170, which represents the kinematic state of the transmission 12 as assumed by one or more controllers or control routines associated with the transmission 12. The dotted line 170 from time 180 to time 182 (i.e., time segment I) represents what is known as the "torque phase" of the shift, and the dotted line 170 from time 182 to time 184 (i.e., time segment II) represents the "inertia phase" of the shift. In the torque phase (time segment I), the oncoming clutch 66 begins to have clutch capacity but the offgoing clutch 64 has not begun to slip yet, so during this phase both clutches 64, 66 carry torque. However, this phase is not easily observable and the torque-carrying characteristics of the transmission 12 during this phase are very similar to the characteristics prior to time 180 (i.e., time segment IV), so most control models approximate this torque phase to be the same kinematic state as the phase before time 180. (Hence the horizontal dotted line 170 between time 180 and time 182, which is at the same horizontal level as the solid line 160 prior to time 180.) The dotted line 170 between time 182 and time 184 (time segment II) shows a rise in level beginning at time 182; this represents that the transmission 12 has entered into a different kinematic state during this time, which is the aforementioned inertia phase. Then at time 184, the dotted line 170 falls to the same level as the solid line 160, indicating that the downshift from $4^{th}$ gear to $3^{rd}$ gear has been completed and the transmission kinematic state is that of being fully in 3rd gear (i.e., time segment III).

Thus, a first gear state 186 is defined by the time or transmission state/phase leading up to time 182, a second gear state 190 is defined by the time or transmission state/phase after time 190, and an intermediate state 188 is defined by the time or transmission state/phase between times 182 and 184 (i.e., between the first gear state 186 and the second gear state 190). In the present example, the first gear state 186 would be $4^{th}$ gear, the second gear state 190 would be $3^{rd}$ gear, and the intermediate state 188 would be the phase during which the transmission transitions (in this case, downshifts) from $4^{th}$ gear to $3^{rd}$ gear. The first and second gear states 186, 190 may be referred to as "fixed gear" states or phases, and the intermediate state 188 may be referred to as an "inertia" state or phase.

Figure 3:
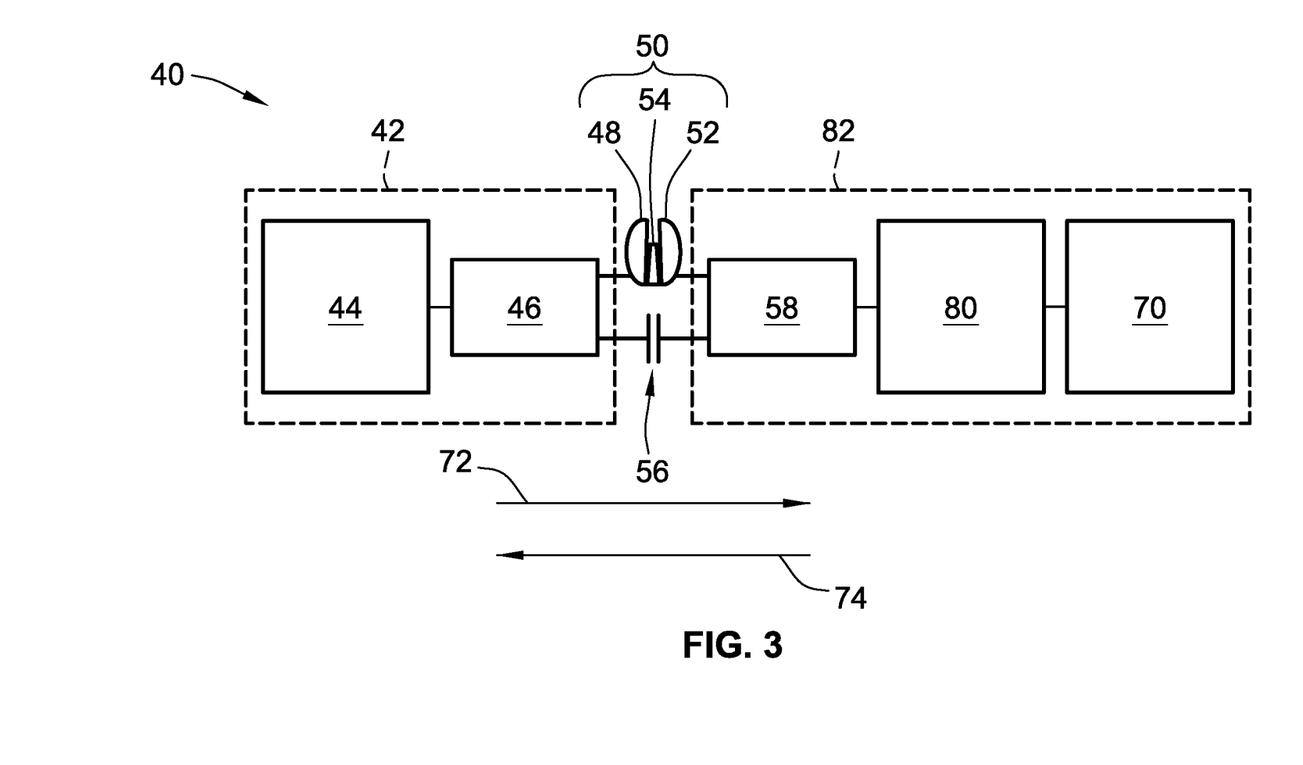
FIG. 3 is a schematic view of a powerflow during first and second (fixed) gear states in accordance with the disclosure.

FIG. 3 shows a schematic illustration of the first and second gear states 186, 190 which are also fixed gear states. A powerflow 40 is shown which includes several components or systems "lumped" or "aggregated" together in groups for the purpose of grouping their rotational inertias. (These lumped groupings can represent the components or systems themselves, and/or they can represent the collective rotational inertias of the components or systems.) Group 44 (the "engine group") represents the inertias of the engine, accessory drive, valve train, flexplate and any other components upstream of the torque converter 50. (Note that arrows 72 and 74 represent "downstream" and "upstream" powerflow directions, respectively. The flow or sequence of components and systems within the powerflow 40 in a direction from the transmission input shaft to the transmission output shaft defines the downstream direction 72, and the opposite flow or direction from the transmission output shaft to the transmission input shaft defines the upstream direction 74. The downstream and upstream directions 72, 74 may also be defined as the directions from the engine to the wheels and from the wheels to the engine, respectively.)

Engine group 44 is operatively connected to group 46, which represents the inertia of the torque converter pump 48. The torque converter 50 includes a pump 48 connected to the output of the engine group 44 (e.g., the flexplate), a stator 54, and a turbine 52 connected to the input shaft of the transmission 12. A lock-up clutch 56 is also provided between the pump 48 and turbine 52; when the pump 48 and turbine 52 are at essentially the same rotational speeds, the lock-up clutch 56 may be engaged to rigidly lock the pump 48 and turbine 52 together rotationally. Group 42 represents the combined inertias (and torques) of the engine group 44 and torque converter pump 48, which transmit an input torque through the torque converter 50 and into group 82. This group 82 represents the combined rotational inertias (and torques) of the torque converter turbine/input shaft 58 (which are permanently and rigidly attached to one another), the transmission components 80 downstream of the input shaft and upstream of and including the transmission output shaft, and the grouping 70 of the drive shaft, differential, axle/half-axles, and driven wheels. (Note that a drive shaft would apply to longitudinal configurations of the transmission 12 in a vehicle 90, but not to transverse configurations.) In addition to the input and output shafts, the transmission components 80 may include a plurality of rotating transmission components, such as planetary gearsets, connections between planetary gearsets, bearings, clutches, brakes and one-way/freewheel clutches.

In the fixed gear state illustrated in FIG. 3, the elements within group 82—i.e., the rotating torque converter turbine 58, the rotating transmission components 80 and the rotating elements of group 70—may be treated as if they are one rigidly interconnected rotating mass or inertia. However, that does not mean that the individual elements within group 82 are rotating at the same speed. In fact, the elements within group 82 will most likely be rotating at a variety of different speeds, depending upon the various gear ratios of their interconnections. However, since there is no appreciable clutch slippage occurring in the fixed gear phase of the first and second gear states 186, 190, the elements in group 82 may be treated as a single inertia, as viewed from the perspective of a selected single reference point, with the inertia of each individual rotating element within group 82 being converted to that single reference point by the appropriate gear ratio to a respective converted inertia. (This process of taking the rotational inertia of an element positioned and rotating at one location, and converting it to an equivalent rotational inertia at another location or reference point by applying appropriate gear ratios, may be referred to as "reflecting" that inertia to the reference point, or stating that the inertia of the rotating element has been "reflected" to the reference point.) The reference point(s) to which the inertias may be reflected may be any desired location, such as the turbine/transmission input shaft and/or the transmission output shaft. Once these individual respective converted inertias are determined, they can be summed up as a collective or aggregate inertia representative of the entirety of group 82. This reflection and summation of inertias at one or more reference points makes certain determinations involving system torques and inertias much easier.

Figure 4:
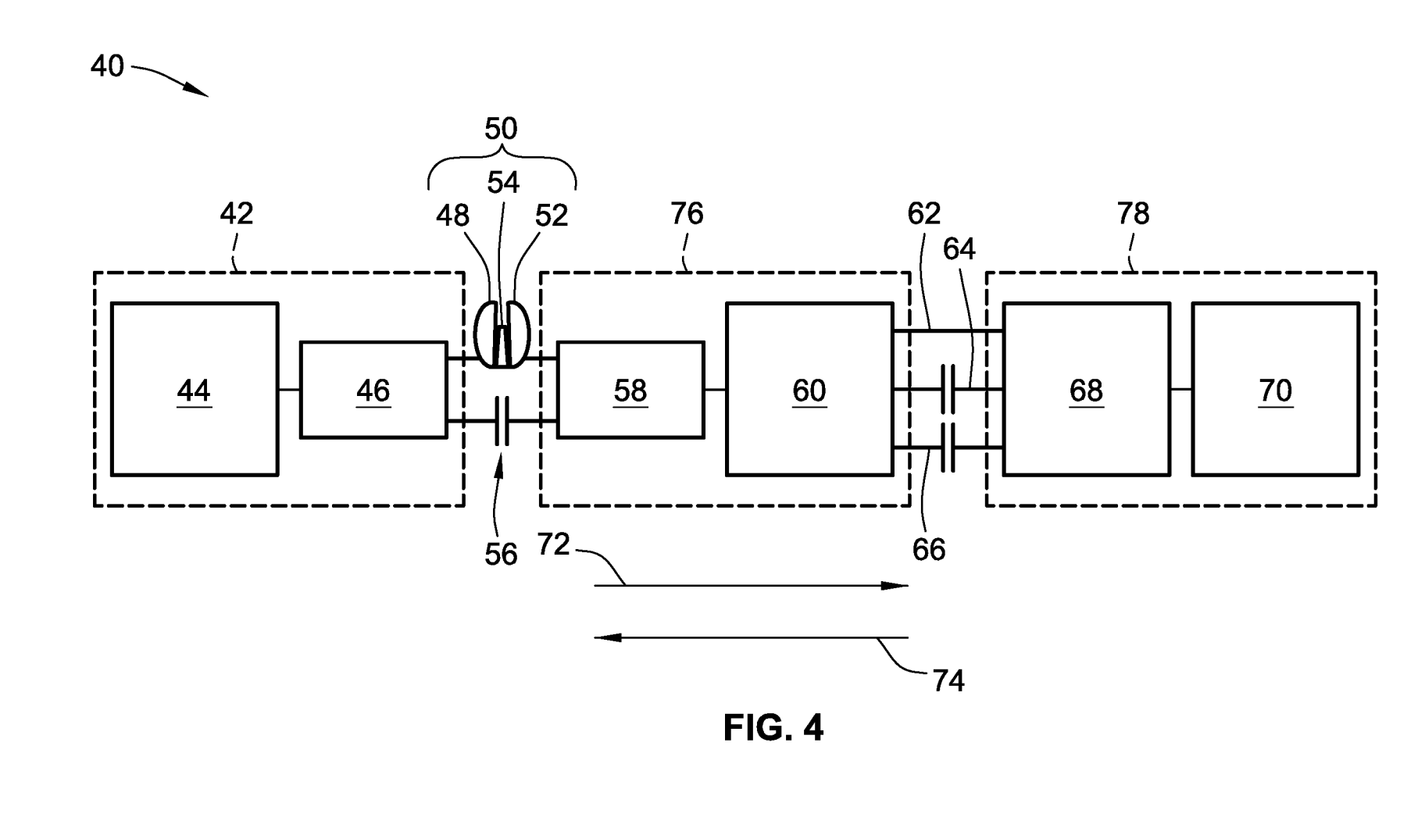
FIG. 4 is a schematic view of a powerflow during an intermediate (inertia phase) state in accordance with the disclosure.

FIG. 4 shows a schematic illustration of the intermediate state 188, also referred to as the inertia phase. This powerflow 40 is similar to the one for the fixed gear state, in that the inertia 58 of the torque converter turbine 52 and input shaft, and the inertia 70 of the drive shaft, differential, axle/half-axles and driven wheels, are lumped in the same way. However, instead of a single grouping 82 of all the elements downstream from the torque converter 50, here those elements are divided into two groupings: those upstream of the one or more shifting clutches in group 76, and those downstream of the one or more shifting clutches in group 78. These elements are divided into two separate groups 76, 78 because the slippage of the one or more shifting clutches separates the rigid connection between these groups 76, 78 that would otherwise be there during the fixed gear phase. Because of this separation, the two groups 76, 78 tend to rotate as two separate groupings, with all the elements of group 76 rotating together and all the elements of group 78 rotating together, such that it becomes much more difficult to treat the entire group 82 of elements as a single rotational entity. Because of this, for the inertia phase each group 76, 78 may be reflected to a reference point independently. For example, it may be convenient to reflect the inertias of all the elements in group 76 to the turbine/input shaft (i.e., the "input domain"), and to reflect the inertias of all the elements in group 78 to the output shaft (i.e., the "output domain"). However, each group 76, 78 may be reflected to any desired reference point, and they may even be reflected to the same reference point.

Whereas the fixed gear phase shown in FIG. 3 may group all the transmission elements downstream of the input shaft and upstream of and including the output shaft as group 80, the inertia phase shown in FIG. 4 may divide those transmission elements into two smaller groupings: a group 60 of transmission elements downstream of the input shaft and upstream of the one or more shifting clutches, and a group 68 of transmission elements downstream of the one or more shifting clutches and upstream of and including the output shaft. Note that groups 76 and 78 are separated by a holding clutch 62, an offgoing clutch 64 and an oncoming clutch 66. These elements 62, 64, 66 are for illustration purposes only, as various transmission configurations may utilize a variety of different combinations of clutches, brakes, one-way/freewheel clutches and holding clutches in their shift strategies from one gear state to another. Therefore, the one or more shifting clutches referred to herein may include whatever combination of clutches, brakes, one-way/freewheel clutches and holding clutches are used to switch from one fixed gear state to another fixed gear state, including power-on upshifts, power-on downshifts, coasting upshifts and coasting downshifts.

Utilizing the groupings of inertias for the fixed gear and inertia phases described above, a method 200 of determining a transmission output torque $T_{OUT}$ for a transmission 12 may be described. As illustrated by the flowchart shown in FIG. 5, a method 200 of determining a transmission output torque $T_{OUT}$ 144 for a transmission 12 includes the following steps. At block 210, a transmission kinematic state is determined. At block 220, a transmission input torque $T_{IN}$ is determined. At block 230, a first rotational acceleration $Ndot_1$ of a first portion of the transmission 12 rotationally disposed at a first reference point in the transmission 12 is determined. (For example, the first portion of the transmission and the first reference point may be the input shaft, and the first rotational acceleration $Ndot_1$ may be the rotational acceleration of the input shaft.) At block 240, a second acceleration $Ndot_2$ of a second portion of the transmission rotationally disposed at a second reference point in the transmission 12 is determined. (For example, the second portion of the transmission and the second reference point may be the output shaft, and the second rotational acceleration $Ndot_2$ may be the rotational acceleration of the output shaft.) And at block 250, the transmission output torque $T_{OUT}$ is determined as $A(T_{IN}) + B(Ndot_1) + C(Ndot_2)$, where A is the gear ratio of the commanded transmission gear range, and coefficients B and C are aggregate inertias based on the transmission kinematic state.

Figure 5:
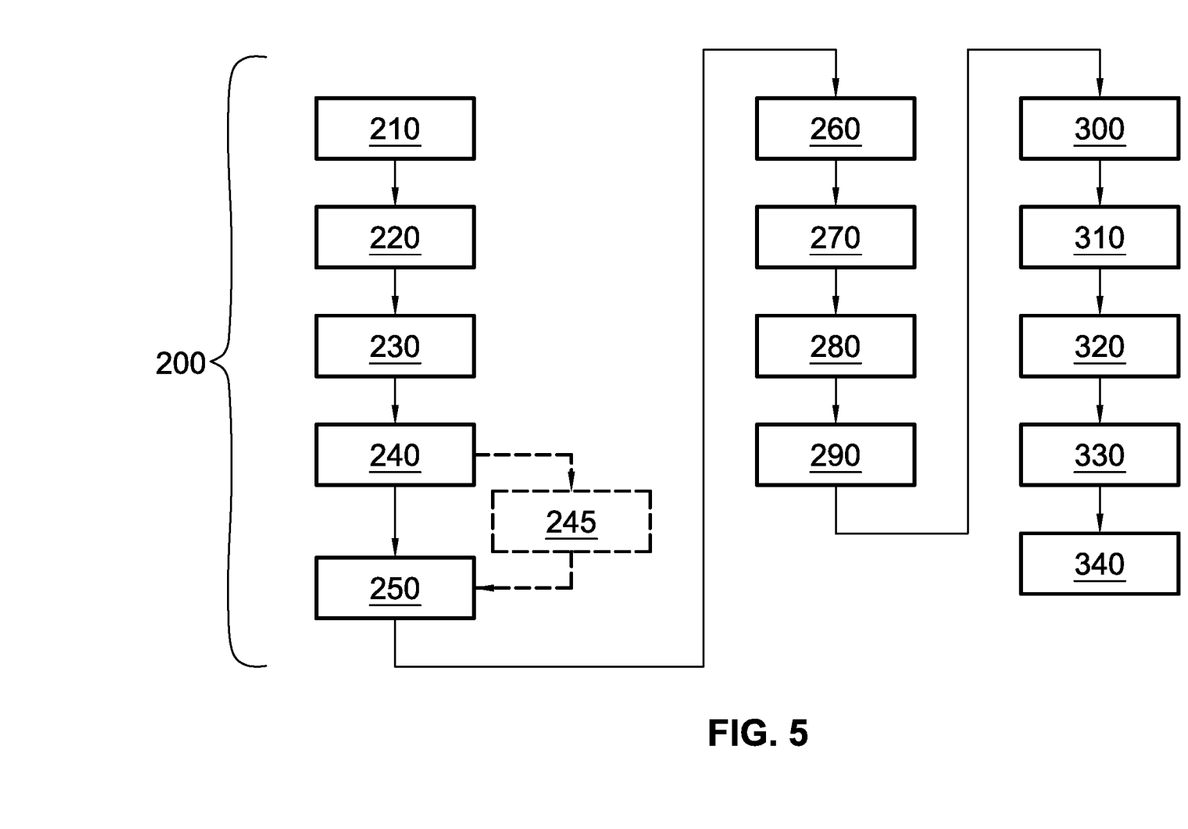
FIG. 5 is a flowchart of a method of determining a transmission output torque in accordance with the disclosure.

The transmission kinematic state describes how all the components within the transmission 12 are interconnected for a given state of the transmission 12 or a given phase of its operation. This includes how torque is transferred from the input shaft, through the planetary gearsets as interconnected by various clutches and brakes, and out via the output shaft. The transmission kinematic state may be determined from a commanded transmission gear range (e.g., $3^{rd}$ gear), a transmission input speed $N_{IN}$, and a transmission output speed $N_{OUT}$. The transmission kinematic state may be one of a first gear state 186 (e.g., $4^{th}$ gear) having a first gear ratio, a second gear state 190 (e.g., $3^{rd}$ gear) having a second gear ratio lower than the first gear ratio, and an intermediate state 188 during which the transmission 12 transitions from the first gear state 186 to the second gear state 190.

The transmission 12 may be configured for use in a vehicle 90 having a powerflow 40 including a series of powerflow members comprising a torque converter turbine 52, a transmission input shaft, a plurality of rotating transmission components including at least one shifting clutch, a transmission output shaft, a differential, at least one axle, at least one driven wheel and, if the transmission is configured for longitudinal use in the vehicle, a drive shaft. (Note that the "powerflow members", as used herein, includes the components and systems within group 82 for the fixed gear phase, and groups 76 and 78 for the inertia phase, but does not include the elements of group 42. Even though the components and systems in group 42 are elements of the overall powerflow 40, they are not included within the definition of "powerflow members" as used herein because the "powerflow members" are considered as the elements of the powerflow 40 that are downstream of and including the turbine/input shaft, into which the input torque $T_{IN}$ is applied. The elements of group 42 create the input torque $T_{IN}$, so their inertias do not need to be reflected to any reference point for purposes of the equations presented herein.) Each of the powerflow members has a respective rotational inertia, a respective first conversion gear ratio with respect to the first reference point, a respective second conversion gear ratio with respect to the second reference point, a respective first converted rotational inertia being the respective rotational inertial multiplied by the respective first conversion gear ratio, and a respective second converted rotational inertia being the respective rotational inertial multiplied by the respective second conversion gear ratio.

For example, assume the input shaft and output shaft are selected as the first and second reference points, respectively, the differential is selected as an area of focus, and the transmission is in $4^{th}$ gear in a fixed gear state. The rotational inertia of the differential may be determined by the formula $I=mr^2$, where m is the mass of the rotating portion of the differential and r is the radius of rotation for the center of gravity for the rotating portion. However, to reflect this rotational inertia of the differential to the input shaft, the gear ratio between the differential and the input shaft for $4^{th}$ gear must be determined (i.e., the first conversion gear ratio). This gear ratio can be determined by tracing all the kinematic elements connected between the differential and the input shaft when the transmission 12 is in $4^{th}$ gear, and accounting for the number of gear teeth at each kinematic element connection. This (first conversion) gear ratio can then be multiplied by the rotational inertia ($mr^2$) to arrive at the first converted rotational inertia, which is the differential's rotational inertia reflected to the input shaft. This same process can be applied to the output shaft to arrive at the second converted rotational inertia, which is the differential's rotational inertia reflected to the output shaft. This process can be applied to every powerflow member, and the appropriate summations of reflected inertias made as described below.

In the transmission output torque equation $T_{OUT}=A(T_{IN})+B(Ndot_1)+C(Ndot_2)$, coefficient A is the gear ratio of the commanded transmission gear range. Each of the second and third terms represents an inertia multiplied by a rotational acceleration, which yields a torque. Note that B and $Ndot_1$ are the aggregate inertia and rotational acceleration, respectively, at the first reference point, and C and $Ndot_2$ are the aggregate inertia and rotational acceleration, respectively, at the second reference point. In each of the first and second (fixed) gear states 186, 190, coefficient B is a sum of the respective first converted rotational inertias of all of the powertrain members 82 when C=0, and C is a sum of the respective second converted rotational inertias of all of the powertrain members 82 when B=0. In other words, since all the powerflow members in group 82 are considered to be rigidly connected together without slipping, one reference point is sufficient for reflecting all the powerflow members' inertias to. Thus, the first reference point may be selected, with the torque component $B(Ndot_1)$ being determined and C being set to zero. Or, the second reference point may be selected, with the torque component $C(Ndot_2)$ being determined and B being set to zero. Alternatively, some combination of the first and second reference points may be considered, with torque contributions being contributed from each of the two reference points; in such a case, each powerflow member would be reflected to one reference point or the other, but not to both. In the intermediate (inertia phase) gear state, B is the sum of the respective first converted rotational inertias 76 of the powertrain members upstream of the at least one shifting clutch, and C is the sum of the respective second converted rotational inertias 78 of the powertrain members downstream of the at least one shifting clutch. For example, the turbine/transmission input shaft and the transmission output shaft may be selected as the first and second reference points, respectively. In this example, the inertias of group 82 may be reflected to the turbine/input shaft, the inertias of group 76 may be reflected to the turbine/input shaft, and the inertias of group 78 may be reflected to the output shaft. For determining Tour during the intermediate (inertia phase) state, B would be the sum of the inertias from group 76 that were converted/reflected to the turbine/input shaft and C would the sum of the inertias from group 78 that were converted/reflected to the output shaft. And for determining Tour during the first and second (fixed) gear states, B would be the sum of the inertias from group 82 that were converted/reflected to the turbine/input shaft and C would be zero. Alternatively, if the inertias of group 82 were instead reflected to the output shaft, then for determining Tour during the first and second (fixed) gear states, C would be the sum of the inertias from group 82 that were converted/reflected to the output shaft and B would be zero.

In one embodiment, the first acceleration $Ndot_1$ may be a transmission input shaft acceleration $Ndot_{IN}$ and the second acceleration $Ndot_2$ may be a transmission output shaft acceleration $Ndot_{OUT}$. $I_{2\_IN}$ and $I_{2\_OUT}$ may be defined as sums of respective input-reflected rotational inertias and output-reflected rotational inertias, respectively, of the torque converter turbine 52 and the transmission input shaft (i.e., group 58). $I_{3\_IN}$ and $I_{3\_OUT}$ may be sums of respective input-reflected rotational inertias and output-reflected rotational inertias, respectively, of the rotating transmission components downstream of the transmission input shaft and upstream of the one or more shifting clutches (i.e., group 60). $I_{4\_IN}$ and $I_{4\_OUT}$ may be sums of respective input-reflected rotational inertias and output-reflected rotational inertias, respectively, of the rotating transmission components downstream of the one or more shifting clutches and upstream of and including the transmission output shaft (i.e., group 68). $I_{3+4\_IN}$ and $I_{3+4\_OUT}$ may be sums of respective input-reflected rotational inertias and output-reflected rotational inertias, respectively, of the rotating transmission components downstream of the transmission input shaft and upstream of and including the transmission output shaft (i.e., group 80). And $I_{5\_IN}$ and $I_{5\_OUT}$ may be sums of respective input-reflected rotational inertias and output-reflected rotational inertias, respectively, of the differential, the axle/half-axles, the driven wheels and, if the transmission 12 is configured for longitudinal use in the vehicle 90, the drive shaft. In this configuration, A would be the gear ratio of the commanded transmission gear range; in each of the first and second (fixed) gear states 186, 190, $B=I_{2\_IN}+I_{3+4\_IN}+I_{5\_IN}$ when C=0, and $C=I_{2\_OUT}+I_{3+4\_OUT}+I_{5\_OUT}$ when B=0; and in the intermediate (inertia phase) gear state 188, $B=I_{2\_IN}+I_{3\_IN}$ and $C=I_{4\_OUT}+I_{5\_OUT}$.

In one embodiment, the method 200 may optionally include, at block 245, determining a third acceleration $Ndot_3$ at a third reference point in the transmission, at a point that is different from each of the first and second reference points. (Note that block 245, and the flow from block 240 to block 245 to block 250, are shown in dashed lines to indicate that this is an optional alternative path.) This option 245 may be pursued when it is desired to select two reference points for use in the determination of $T_{OUT}$ for the intermediate (inertia phase) state 188, and a different third reference point for use in the determination of $T_{OUT}$ for the first and second (fixed gear) states 186, 190. If this option 245 is pursued, then at block 250 the transmission output torque $T_{OUT}$ may be determined as $A(T_{IN})+B(Ndot_1)+C(Ndot_2)+D(Ndot_3)$, wherein A, B, C and D are coefficients based on the transmission kinematic state. Each of the powerflow members has a respective rotational inertia, a respective first conversion gear ratio with respect to the first reference point, a respective second conversion gear ratio with respect to the second reference point, a respective third conversion gear ratio with respect to the third reference point, a respective first converted rotational inertia being the respective rotational inertial multiplied by the respective first conversion gear ratio, a respective second converted rotational inertia being the respective rotational inertial multiplied by the respective second conversion gear ratio, and a respective third converted rotational inertia being the respective rotational inertial multiplied by the respective third conversion gear ratio. Coefficient A would be a gear ratio of the commanded transmission gear range. In the intermediate (inertia phase) gear state 188, B would be the sum of the respective first converted rotational inertias of the powertrain members upstream of the at least one shifting clutch, C would be the sum of the respective second converted rotational inertias of the powertrain members downstream of the at least one shifting clutch, and D would be set to zero. And in each of the first and second (fixed) gear states 186, 190, D would be the sum of the respective third converted rotational inertias of all of the powertrain members, with B and C each being set to zero.

Figure 6:
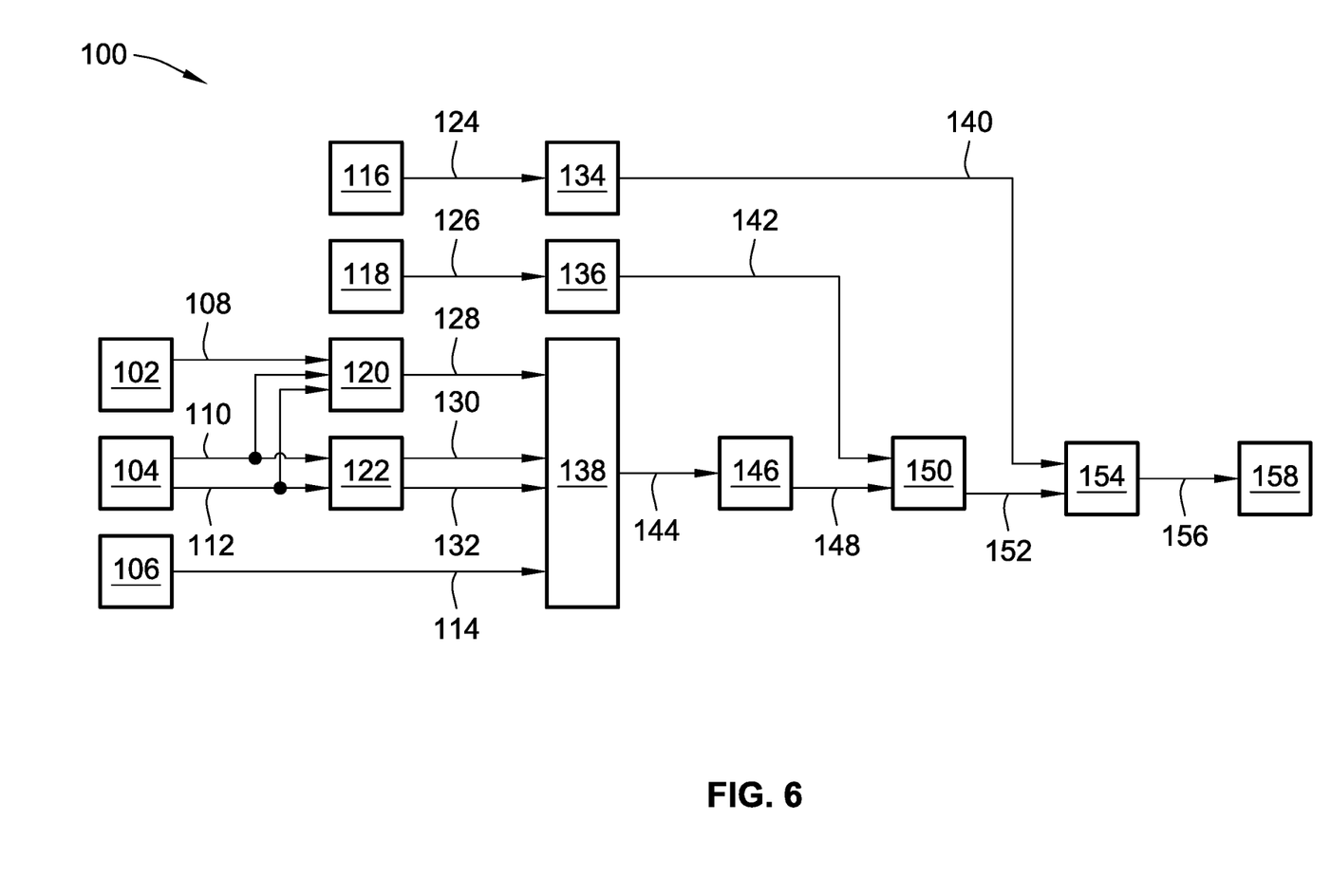
FIG. 6 is a schematic of a control architecture for a method in accordance with the disclosure.

FIG. 6 shows a schematic of an exemplary control architecture 100 for the method 200 of the present disclosure. Note that while this particular control architecture 100 has a very specific set of applications, the method 200 of the present disclosure has many applications beyond this specific control architecture 100. At block 102, a commanded transmission shift (e.g., $4^{th}$ gear to $3^{rd}$ gear) is determined and a commanded transmission shift 108 is output. At block 104, system speeds are determined, such as the transmission turbine/input shaft speed $N_{IN}$ 110 and the transmission output speed $N_{OUT}$ 112. At block 106, the transmission input torque $T_{IN}$ 114 is determined.

At block 116, the brake pedal position is determined and a brake pedal signal 124 is output. At block 118, the accelerator pedal position is determined and an accelerator pedal signal 126 is output. At block 120, the transmission kinematic state 128 is determined and output. At block 122, the turbine/input shaft acceleration $Ndot_{IN}$ 130 and transmission output acceleration $Ndot_{OUT}$ 132 are determined and output. At block 134, the desired total brake torque $T_{TOTAL\_BRAKE\_REQUEST}$ 140 is determined and output. At block 136, the desired coast torque $T_{AXLE\_COAST}$ 142 is determined and output.

At block 138, the transmission kinematic state 128, the turbine/input shaft acceleration $Ndot_{IN}$ 130, the transmission output acceleration $Ndot_{OUT}$ 132 and the transmission input torque $T_{IN}$ 114 are received as inputs, the method 200 of the present disclosure is applied, and a transmission output torque $T_{OUT}$ 144 is determined and output.

Referring now to FIGS. 5 and 6, the method 200 may further include: at block 260, determining a differential ratio $R_{diff}$; at block 270, determining an axle rotational inertia $I_{AXLE}$; at block 280, determining an axle acceleration $Ndot_{AXLE}$; and, at blocks 146 and 290, determining an axle output torque $T_{AXLE}$ 148 as $R_{diff}(T_{OUT})+I_{AXLE}(Ndot_{AXLE})$. The steps of blocks 260, 270 and 280 may be performed as part of block 146 or as one or more separate processes, such as consulting one or more look-up tables for the differential ratio $R_{diff}$ and the axle rotational inertia $I_{AXLE}$.

The method 200 may additionally include: at blocks 136 (mentioned above) and 300, determining a desired coast torque $T_{AXLE\_COAST}$ 142; and, at blocks 150 and 310, determining a propulsion system torque $T_{AXLE\_BRAKE}$ 152 as $T_{AXLE}-T_{AXLE\_COAST}$.

The method 200 may also include: at blocks 134 (mentioned above) and 320, determining a desired total brake torque $T_{TOTAL\_BRAKE\_REQUEST}$ 140; and, at blocks 154 and 330, determining a commanded friction brake torque $T_{FRICTION\_BRAKE}$ 156 as $T_{TOTAL\_BRAKE\_REQUEST}-T_{AXLE\_BRAKE}$. The method 200 may further include, at blocks 158 and 340, providing a signal for actuation of a friction braking system 16, wherein the signal corresponds to the commanded friction brake torque $T_{FRICTION\_BRAKE}$.

The control architecture 100 and method 200 as described above are suited for transmission 12 and vehicle 90 operation during closed throttle downshifts, blended braking regimes and other applications, including wherever an accurate estimation of the transmission output torque $T_{OUT}$ and/or the axle output torque $T_{AXLE}$ would be useful.

The above description is intended to be illustrative, and not restrictive. While various specific embodiments have been presented, those skilled in the art will recognize that the disclosure can be practiced with various modifications within the spirit and scope of the claims. For example, the above-described embodiments (and/or aspects thereof) may be used in combination with each other. In addition, many modifications may be made to adapt a particular situation or material to the teachings of the disclosure without departing from its scope. While the dimensions and types of materials described herein are intended to be illustrative, they are by no means limiting and are exemplary embodiments. Many other embodiments will be apparent to those of skill in the art upon reviewing the above description. Moreover, in the following claims, use of the terms "first", "second", "top", "bottom", etc. are used merely as labels, and are not intended to impose numerical or positional requirements on their objects. Further, the limitations of the following claims are not written in means-plus-function or step-plus-function format and are not intended to be interpreted as such, unless and until such claim limitations expressly use the phrase "means for" or "step for" followed by a statement of function void of further structure. As used herein, an element or step recited in the singular and preceded by the word "a" or "an" should be understood as not excluding plural of such elements or steps, unless such exclusion is explicitly stated. Furthermore, references to a particular embodiment or example are not intended to be interpreted as excluding the existence of additional embodiments or examples that also incorporate the recited features. Moreover, unless explicitly stated to the contrary, embodiments "comprising" or "having" an element or a plurality of elements having a particular property may include additional such elements not having that property.

The flowcharts and block diagrams in the drawings illustrate the architecture, functionality and/or operation of possible implementations of systems, methods and computer program products according to various embodiments of the present disclosure. In this regard, each block in the flowchart or block diagrams may represent a module, segment or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by hardware-based systems that perform the specified functions or acts, or combinations of hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the functions and/or actions specified in the flowcharts and block diagrams.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A method of controlling a transmission during closed throttle downshifts comprising:
   determining a transmission kinematic state based on a commanded transmission gear range, a transmission input speed, and a transmission output speed;
   determining a transmission input torque;

determining a first rotational acceleration of a first portion of the transmission rotationally disposed at a first reference point in the transmission;

determining a second rotational acceleration of a second portion of the transmission rotationally disposed at a second reference point in the transmission; and determining a transmission output torque as a sum of a gear ratio of the commanded transmission gear range multiplied by the transmission input torque, a first aggregate inertia multiplied by the first rotational acceleration, and a second aggregate inertia multiplied by the second rotational acceleration, wherein the first and second aggregate inertias are based on the transmission kinematic state.

2. A method according to claim 1, wherein the transmission kinematic state is one of a first gear state having a first gear ratio, a second gear state having a second gear ratio lower than the first gear ratio, and an intermediate state during which the transmission transitions from the first gear state to the second gear state.

3. A method according to claim 2, wherein:

the transmission is configured for use in a vehicle having a powerflow including a series of powerflow members comprising a torque converter turbine, a transmission input shaft, a plurality of rotating transmission components including at least one shifting clutch, a transmission output shaft, a differential, at least one axle, at least one driven wheel and, if the transmission is configured for longitudinal use in the vehicle, a drive shaft;

the powerflow defines a downstream direction from the transmission input shaft to the transmission output shaft and an upstream direction from the transmission output shaft to the transmission input shaft;

each of the powerflow members has a respective rotational inertia, a respective first conversion gear ratio with respect to the first reference point, a respective second conversion gear ratio with respect to the second reference point, a respective first converted rotational inertia being the respective rotational inertia multiplied by the respective first conversion gear ratio, and a respective second converted rotational inertia being the respective rotational inertia multiplied by the respective second conversion gear ratio;

in each of the first and second gear states, the first aggregate inertia is a sum of the respective first converted rotational inertias of all of the powertrain members when the second aggregate inertia is set to zero, and the second aggregate inertia is a sum of the respective second converted rotational inertias of all of the powertrain members when the first aggregate inertia is set to zero; and in the intermediate gear state, the first aggregate inertia is a sum of the respective first converted rotational inertias of the powertrain members upstream of the at least one shifting clutch, and the second aggregate inertia is a sum of the respective second converted rotational inertias of the powertrain members downstream of the at least one shifting clutch.

4. A method according to claim 1, wherein the first reference point is one of a torque converter turbine and a transmission input shaft, and the second reference point is a transmission output shaft.

5. A method according to claim 1, further comprising:
determining a differential ratio;
determining an axle rotational inertia;
determining an axle acceleration; and
determining an axle output torque as a sum of the differential ratio multiplied by the transmission output torque and the axle rotational inertia multiplied by the axle acceleration.

6. A method according to claim 5, further comprising:
determining a desired coast torque; and
determining a propulsion system torque as a difference between the axle output torque and the desired coast torque.

7. A method according to claim 6, further comprising:
determining a desired total brake torque; and
determining a commanded friction brake torque as a difference between the desired total brake torque and the propulsion system torque.

8. A method according to claim 7, further comprising:
providing a signal for actuation of a friction braking system, wherein the signal corresponds to the commanded friction brake torque.

9. A method according to claim 8, wherein the method is configured for operation during blended braking.

10. A method of determining a transmission output torque $T_{OUT}$ for a transmission, comprising:

determining a transmission kinematic state based on a commanded transmission gear range, a transmission input speed $N_{IN}$, and a transmission output speed $N_{OUT}$, wherein the transmission kinematic state is one of a first gear state having a first gear ratio, a second gear state having a second gear ratio lower than the first gear ratio, and an intermediate state during which the transmission transitions from the first gear state to the second gear state;

determining a transmission input torque $T_{IN}$;

determining a first acceleration $Ndot_1$ at a first reference point in the transmission;

determining a second acceleration $Ndot_2$ at a second reference point in the transmission; and determining the transmission output torque $T_{OUT}$ as $A(T_{IN})+B(Ndot_1)+C(Ndot_2)$, wherein A is a gear ratio of the commanded transmission gear range, and B and C are aggregate inertias based on the transmission kinematic state.

11. A method according to claim 10, wherein:

the transmission is configured for use in a vehicle having a powerflow including a series of powerflow members comprising a torque converter turbine, a transmission input shaft, a plurality of rotating transmission components including at least one shifting clutch, a transmission output shaft, a differential, at least one axle, at least one driven wheel and, if the transmission is configured for longitudinal use in the vehicle, a drive shaft;

the powerflow defines a downstream direction from the transmission input shaft to the transmission output shaft and an upstream direction from the transmission output shaft to the transmission input shaft;

each of the powerflow members has a respective rotational inertia, a respective first conversion gear ratio with respect to the first reference point, a respective second conversion gear ratio with respect to the second reference point, a respective first converted rotational inertia being the respective rotational inertia multiplied by the respective first conversion gear ratio, and a respective second converted rotational inertia being the respective rotational inertia multiplied by the respective second conversion gear ratio;

in each of the first and second gear states, B is a sum of the respective first converted rotational inertias of all of the powertrain members when C=0, and C is a sum of the respective second converted rotational inertias of all of the powertrain members when B=0; and in the intermediate gear state, B is a sum of the respective first converted rotational inertias of the powertrain members upstream of the at least one shifting clutch, and C is a sum of the respective second converted rotational inertias of the powertrain members downstream of the at least one shifting clutch.

12. A method according to claim 10, wherein the first reference point is one of a torque converter turbine and a transmission input shaft, and the second reference point is a transmission output shaft.

13. A method according to claim 12, further comprising:
determining a differential ratio $R_{diff}$;
determining an axle rotational inertia $I_{AxLE}$;
determining an axle acceleration $Ndot_{AxLE}$; and
determining an axle output torque $T_{AXLE}$ as $R_{diff}(T_{OUT})+ I_{AXLE}(Ndot_{AXLE})$.

14. A method according to claim 13, wherein the method is configured for operation during closed throttle downshifts, further comprising:
determining a desired coast torque $T_{AXLE\_COAST}$;
determining a propulsion system torque $T_{AXLE\_BRAKE}$ as $T_{AXLE}-T_{AXLE\_COAST}$;
determining a desired total brake torque $T_{TOTAL\_BRAKE\_REQUEST}$;
determining a commanded friction brake torque $T_{FRICTION\_BRAKE}$ as $T_{TOTAL\_BRAKE\_REQUEST}-T_{AXLE\_BRAKE}$; and
providing a signal for actuation of a friction braking system, wherein the signal corresponds to the commanded friction brake torque $T_{FRICTION\_BRAKE}$.

15. A method of determining a transmission output torque $T_{OUT}$ for a transmission, comprising:
determining a transmission kinematic state based on a commanded transmission gear range, a transmission input speed NIN, and a transmission output speed $N_{OUT}$, wherein the transmission kinematic state is one of a first gear state having a first gear ratio, a second gear state having a second gear ratio lower than the first gear ratio, and an intermediate state during which the transmission transitions from the first gear state to the second gear state;
determining a transmission input torque $T_{IN}$;
determining a first acceleration $Ndot_1$ at a first reference point in the transmission;
determining a second acceleration $Ndot_2$ at a second reference point in the transmission different from the first reference point;
determining a third acceleration $Ndot_3$ at a third reference point in the transmission different from each of the first and second reference points; and
determining the transmission output torque $T_{OUT}$ as $A(T_{IN})+B(Ndot_1)+C(Ndot_2)+D(Ndot_3)$, wherein A is a gear ratio of the commanded transmission gear range and B, C and D are aggregate inertias based on the transmission kinematic state.

16. A method according to claim 15, wherein:
the transmission is configured for use in a vehicle having a powerflow including a series of powerflow members comprising a torque converter turbine, a transmission input shaft, a plurality of rotating transmission components including at least one shifting clutch, a transmission output shaft, a differential, at least one axle, at least one driven wheel and, if the transmission is configured for longitudinal use in the vehicle, a drive shaft;
the powerflow defines a downstream direction from the transmission input shaft to the transmission output shaft and an upstream direction from the transmission output shaft to the transmission input shaft;
each of the powerflow members has a respective rotational inertia, a respective first conversion gear ratio with respect to the first reference point, a respective second conversion gear ratio with respect to the second reference point, a respective third conversion gear ratio with respect to the third reference point, a respective first converted rotational inertia being the respective rotational inertia multiplied by the respective first conversion gear ratio, a respective second converted rotational inertia being the respective rotational inertia multiplied by the respective second conversion gear ratio, and a respective third converted rotational inertia being the respective rotational inertia multiplied by the respective third conversion gear ratio;
in the intermediate gear state, B is a sum of the respective first converted rotational inertias of the powertrain members upstream of the at least one shifting clutch, C is a sum of the respective second converted rotational inertias of the powertrain members downstream of the at least one shifting clutch, and D=0; and
in each of the first and second gear states, D is a sum of the respective third converted rotational inertias of all of the powertrain members, and B=0 and C=0.

17. A method according to claim 16, further comprising:
determining a differential ratio $R_{diff}$;
determining an axle rotational inertia $I_{AXLE}$;
determining an axle acceleration $Ndot_{AXLE}$; and
determining an axle output torque $T_{AXLE}$ as $R_{diff}(T_{OUT})+ I_{AXLE}(Ndot_{AXLE})$.

18. A method according to claim 17, further comprising:
determining a desired coast torque $T_{AXLE\_COAST}$;
determining a propulsion system torque $T_{AXLE\_BRAKE}$ as $T_{AXLE}-T_{AXLE\_COAST}$;
determining a desired total brake torque $T_{TOTAL\_BRAKE\_REQUEST}$;
determining a commanded friction brake torque $T_{FRICTION\_BRAKE}$ as $T_{TOTAL\_BRAKE\_REQUEST}-T_{AXLE\_BRAKE}$; and
providing a signal for actuation of a friction braking system, wherein the signal corresponds to the commanded friction brake torque $T_{FRICTION\_BRAKE}$.

19. A method according to claim 15, wherein the method is configured for operation during closed throttle downshifts.

* * * * *